(12) United States Patent
Hooshmand et al.

(10) Patent No.: US 9,785,130 B2
(45) Date of Patent: Oct. 10, 2017

(54) DECENTRALIZED ENERGY MANAGEMENT PLATFORM

(71) Applicant: NEC Laboratories America, Inc., Princeton, NJ (US)

(72) Inventors: Ali Hooshmand, Campbell, CA (US); Ratnesh Sharma, San Jose, CA (US)

(73) Assignee: NEC Corporation (JP)

( * ) Notice: Subject to any disclaimer, the term of this patent is extended or adjusted under 35 U.S.C. 154(b) by 287 days.

(21) Appl. No.: 14/681,027

(22) Filed: Apr. 7, 2015

(65) Prior Publication Data

US 2015/0295410 A1  Oct. 15, 2015

Related U.S. Application Data

(60) Provisional application No. 62/055,422, filed on Sep. 25, 2014, provisional application No. 61/978,065, filed on Apr. 10, 2014.

(51) Int. Cl.
| | |
|---|---|
| *H02J 3/46* | (2006.01) |
| *G05B 15/02* | (2006.01) |
| *G06Q 50/06* | (2012.01) |
| *H02J 3/12* | (2006.01) |
| *H02J 3/38* | (2006.01) |
| *H02J 7/34* | (2006.01) |

(52) U.S. Cl.
CPC ............ *G05B 15/02* (2013.01); *G06Q 50/06* (2013.01); *G05B 2219/2639* (2013.01); *H02J 3/12* (2013.01); *H02J 3/382* (2013.01); *H02J 7/34* (2013.01)

(58) Field of Classification Search
CPC ..... H02J 3/12; H02J 3/382; H02J 7/34; G05B 15/02; G05B 2219/2639; G06Q 50/06
USPC ........ 307/18–20; 700/11, 19, 291; 705/7.11; 703/2; 370/252, 201, 468, 331, 329; 455/453, 450, 414.3; 348/43, E13.001
See application file for complete search history.

(56) References Cited

U.S. PATENT DOCUMENTS

| | | | | |
|---|---|---|---|---|
| 7,813,293 | B2 * | 10/2010 | Papandriopoulos | ..... H04B 3/32 370/201 |
| 8,463,408 | B2 * | 6/2013 | Boleko Ribas | ...... H05B 37/029 700/11 |
| 8,468,041 | B1 * | 6/2013 | Vengerov | ......... G06Q 10/06313 455/453 |
| 9,281,689 | B2 * | 3/2016 | Boardman | ................ H02J 3/26 |
| 9,558,313 | B1 * | 1/2017 | Siddiqi | ............... G06F 17/5077 |

(Continued)

*Primary Examiner* — Thomas Skibinski
(74) *Attorney, Agent, or Firm* — Joseph Kolodka

(57) ABSTRACT

A method for power management includes applying a decentralized control to manage a large-scale community-level energy system; obtaining a global optimal solution satisfying constraints between the agents representing the energy system's devices as a state-based potential game with a multi-agent framework; independently optimizing each agent's output power while considering operational constraints and assuring a pure Nash equilibrium (NE), wherein a state space helps coordinating the agents' behavior in energy system to deal with system-wide constraints including supply demand balance, battery charging power constraint and satisfy system-wide and device-level (local) operational constraints; and controlling distributed generations (DGs) and storage devices using the agent's output.

12 Claims, 4 Drawing Sheets

(56) References Cited

U.S. PATENT DOCUMENTS

| | | | |
|---|---|---|---|
| 2007/0087756 A1* | 4/2007 | Hoffberg | G06Q 10/0631 |
| | | | 455/450 |
| 2010/0278141 A1* | 11/2010 | Choi-Grogan | H04W 36/0083 |
| | | | 370/331 |
| 2011/0019627 A1* | 1/2011 | Krishnaswamy | H04L 12/14 |
| | | | 370/329 |
| 2012/0016644 A1* | 1/2012 | De Rossi | G02C 7/02 |
| | | | 703/2 |
| 2012/0314024 A1* | 12/2012 | Tsang | G09G 3/003 |
| | | | 348/43 |
| 2013/0024243 A1* | 1/2013 | Sharma | G06Q 40/06 |
| | | | 705/7.36 |
| 2014/0113600 A1* | 4/2014 | El Gamal | H04W 28/16 |
| | | | 455/414.3 |
| 2016/0224951 A1* | 8/2016 | Hoffberg | G06Q 20/401 |

* cited by examiner

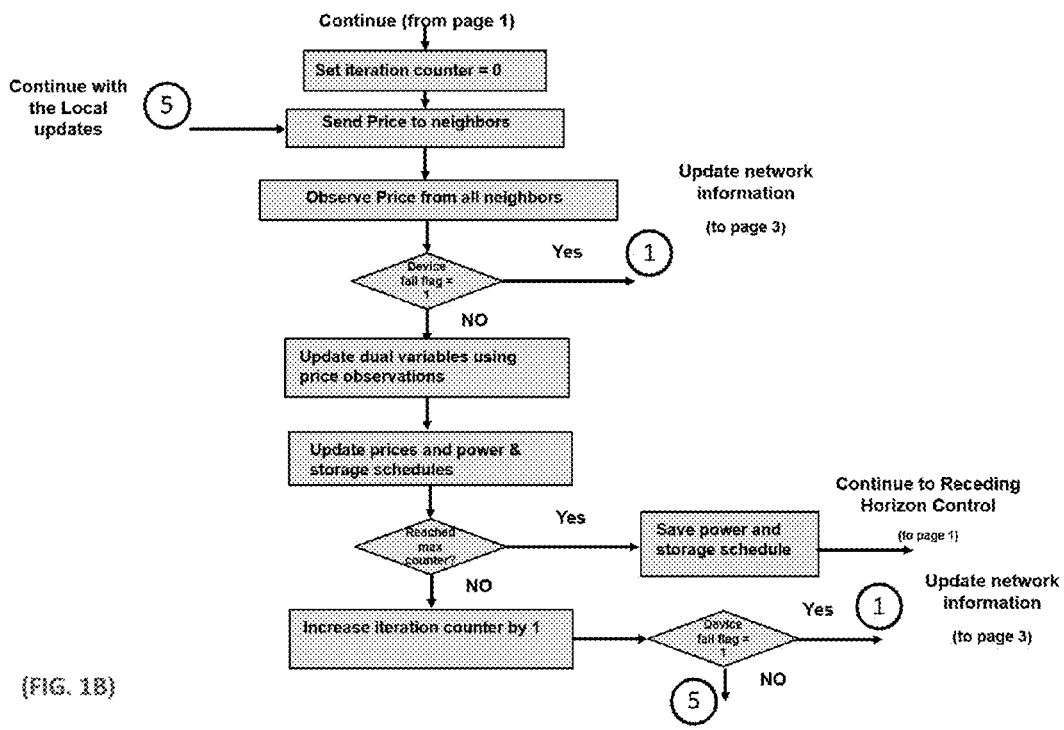
(FIG. 1B)
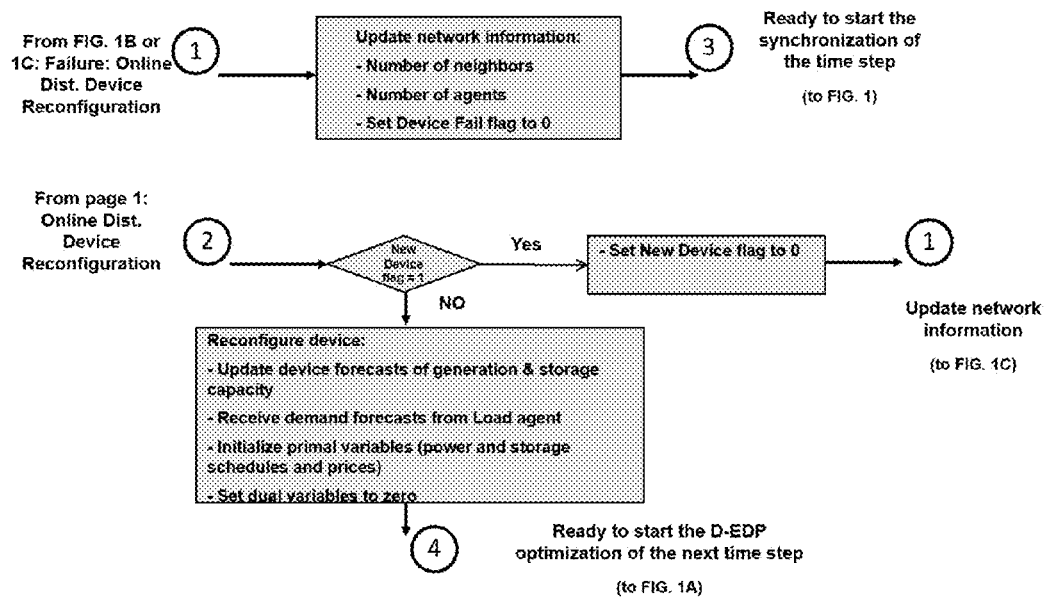
(FIG. 1C)

DECENTRALIZED ENERGY MANAGEMENT PLATFORM

This application claims priority to application Ser. Nos. 61/978,065 and 62/055,422, the contents of which are incorporated by reference.

BACKGROUND

The present invention relates to a decentralized management platform.

One goal of an energy management system (EMS) in power networks is to balance the supply and demand in a cost efficient manner given its operating horizon, and uncertainties in generation due to renewable generators and in demand. There are centralized approaches available in the literature to solve this problem. However, they are not scalable. To add any new device into the energy system, the centralized management systems need to be interrupted, updated and remodeled for any specific new change in the system model. Moreover, as to reliability, any malfunction of the central controller and/or any device results can disrupt the operation of the whole system. There are also some distributed management methods which mostly employ heuristic algorithms. However, these approaches cannot analytically guarantee the optimality of the solution, reliability, and scalability of the system.

Moreover, management of energy systems in community level including distributed generations (DGs) and storage devices can be challenging due to intermittent and uncontrollable nature of many types of DGs, energy sources with different rates, and the following issues:

1. Scalability: The community-level energy systems are large in size, and are also capable to grow more and add new components during their lifetime. Adding any new device introduces new set of parameters, objectives, and constraints in the operation of these systems. As a result, the management platform should be able to integrate the new devices without any interruption for updating its control algorithm.
2. Reliability: The malfunction of any device in the system should not result in an interrupt in the operation of the whole system. According to DOE reliability requirements, management systems should guarantee at least 98% reliability to supply critical loads without any outage times.
3. Efficiency: Due to large size of the management problem for these systems, achieving long-term optimal total cost and real-time operation of energy systems is another challenge for management systems.

SUMMARY

In one aspect, a method for decentralized energy management includes collecting information on neighboring power generators; solving a decentralized economic dispatch problem (D-EDP) and incorporating the D-EDP into a receding horizon control; generating a schedule for the power generators based on a forecast of renewable generations and power load; and updating the forecasts locally, where a forecast of renewable generation only needs to be known by the renewable generator device itself and a load device is introduced as a separate device that communicates the forecasted demand to all the other units.

In another aspect, a method for power management includes applying a decentralized control to manage a large-scale community-level energy system; obtaining a global optimal solution satisfying constraints between the agents representing the energy system's devices as a state-based potential game with a multi-agent framework; independently optimizing each agent's output power while considering operational constraints and assuring a pure Nash equilibrium (NE), wherein a state space helps coordinating the agents' behavior in energy system to deal with system-wide constraints including supply demand balance, battery charging power constraint and satisfy system-wide and device-level (local) operational constraints; and controlling distributed generations (DGs) and storage devices using the agent's output.

In another aspect, a decentralized management platform based on multiagent framework and state-based potential game is disclosed. In contrast to most of the current heuristic control methods for multiagent energy systems, this approach analytically obtains the global optimal solution satisfying constraints between the agents (energy system's devices). The potential game is used to design the power management problem as a game. In this way, each agent is able to independently optimize its output power while considers its operational constraints. More important, designed game assures that the pure Nash equilibrium (NE) exists. Moreover, an extension form of potential games, state-based potential game, is employed. The state space added to the game will help with coordinating the agents' behavior in energy system to deal with system-wide constraints such as supply demand balance, battery charging power constraint, etc. As a result, the NE of the game will not only be efficient with respect to system total cost of operation, but also satisfy all system-wide and device-level (local) operational constraints.

In another aspect, a decentralized management platform includes a multi-agent framework and a decentralized control method to manage the large-scale community-level energy systems. The Multi-agent framework for energy systems includes a procedural architecture to add devices as agents into the energy system framework and submit the services they provide for or request from other agents. This framework is dynamic in which agents can join or leave the energy system at any time without interrupting the rest of the system. Supplier agent includes devices which can provide power to supply the load submit their service as a supplier and play as an active agent in the multi-agent framework. The example of these agents can be grid, diesel, PV, battery, etc. It should be noted that battery can be both supplier agent and demand agent. Demand agents includes loads in the network will submit their service as demand in multi-agent framework and inform supplier agents about their requested load value.

In another embodiment, a decentralized power management method includes a distributed dispatching strategy for energy sources and loads based on a special class of game theory, state-based potential game, and a learning algorithm such as gradient play or Newton method. This strategy not only minimizes the total marginal cost of operation for the whole energy system but also satisfies both device-level and system-wide level operational constraints.

Implementations include system-wide & local energy cost model: The total cost of operation for the energy system (system-wide cost model) is the summation of the devices' operational cost (local cost models). System-wide & local operational constraint can be used. Agents' local constraints such as diesel generator capacity are handled locally by the related agent. In order to achieve the minimum system-wide operational cost in a distributed manner, agents use learning algorithms (gradient play or Newton method) at each iteration of the game.

Advantages of the above aspects may include one or more of the following. The system provides an efficient, scalable and reliable solution. Regarding the scalability, each device is self-operated in this platform and the energy system works in a plug-and-play manner. Hence, adding any new device will not interrupt system operation and not require updating the system modeling and consequently the control algorithm.

Furthermore, the reliability and robustness of the system operation will be assured in this platform since the central controller will be removed from the system. Also, any malfunction of devices or communication network will only affect the related section and does not interrupt the whole system operation. Last but not least, the proposed method is efficient and guarantees obtaining the minimum operational cost of operation.

The system provides a reliable and scalable decentralized platform that efficiently manages the operation of a large-scale energy system based on requested load, available renewable generation, time-of-use grid electricity rate, battery condition, diesel generator loading-based cost, etc. In this dynamic platform, any device can join or leave the energy system at any time without interrupting the rest of the system.

BRIEF DESCRIPTION OF THE DRAWINGS

FIGS. 1A-1D show an exemplary d-EMS process.

DESCRIPTION

Figure 1A:
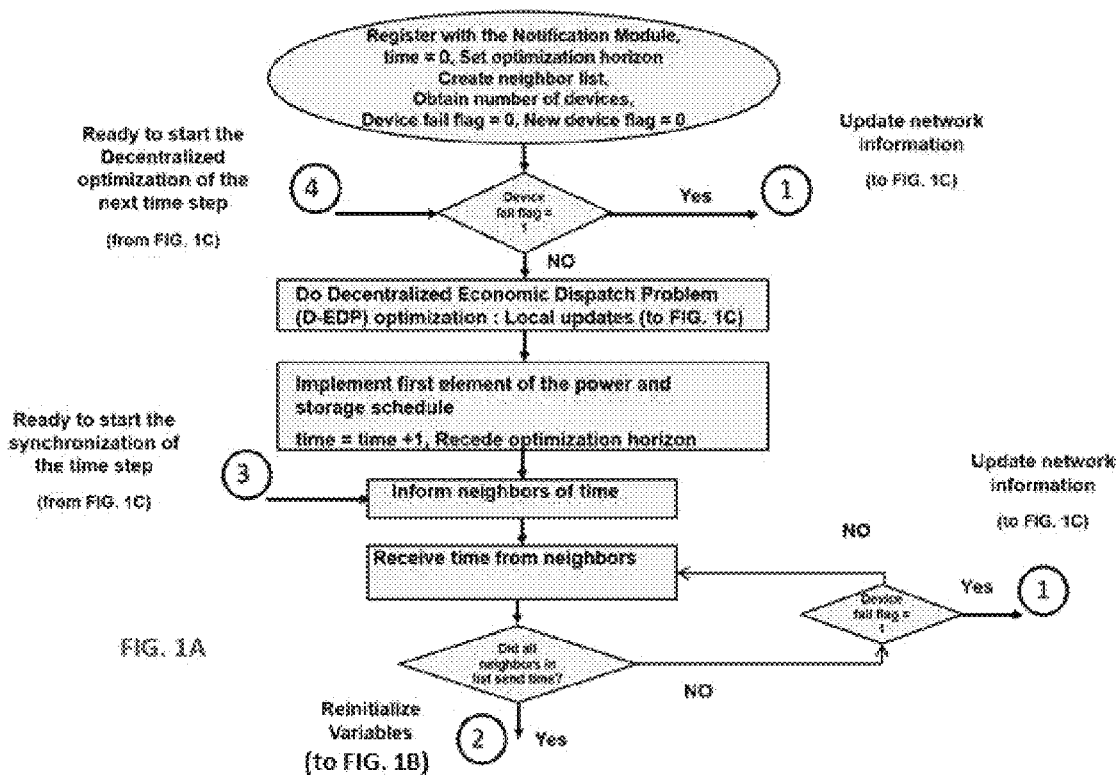

An EMS controls all the devices in a power network with the goal of cost effective performance while matching demand at all times. This goal is translated as the economic dispatch problem (EDP). A centralized management system that solves the EDP requires information from all devices, is prone to catastrophic failures. In addition, centralized EMS has scalability issue for any future expansion. The EMS is interrupted for the integration of any new device to incorporate its operation cost and device specific constraints to the algorithm that EMS implements. Similarly, when a device is up for maintenance a complete shutdown is required. That is, any failure in the EMS or a device in the network enforces a system-wide operation interruption. These issues are overcome with a decentralized energy management system.

To solve scalability issues due to introduction of new generator or storage units and in robustness due to failures in some of the entities in the grid including the EMS itself in a centralized energy management system, a decentralized energy management system (d-EMS) is developed. The d-EMS embeds a decentralized solution to the economic dispatch problem (EDP) based on the alternating direction method of multipliers (ADMM) inside a decentralized implementation of the receding horizon control. The ADMM based algorithm solves the EDP for the scheduling horizon. The receding horizon control allows the system to adapt to changes in the forecasts and network configuration. Decentralized protocols to handle changes to the communication network of devices is provided. These device failure and addition protocols entail network information updates only, thanks to the simple initialization of the ADMM algorithm.

Our decentralized solution to the economic dispatch problem (d-EDP) is shown in FIGS. 1A-1D, which is an ADMM algorithm that operates on the dual of the EDP. The d-EDP derivation entails reformulating the dual of the EDP as a consensus problem on the price of power imbalance, that is, each device keeps a local price for power imbalance but is constrained to agree with its neighbors on the local price. This reformulation admits a decentralized solution using the ADMM algorithm. In the d-EDP, each device synchronously updates individual power and storage profile variables as well as the local price variable by solving a min-max problem. Then devices exchange their local prices with their neighbors and do an ascent step on the dual variables of the local consensus constraints. The algorithm converges to the optimal solution asymptotically when the original problem has strong duality and is convex, and the network is connected. We argue that the asymptotic optimality result carries over to the EDP when the network is connected and cost of each device is convex. Numerical implementations show that convergence to the optimal solution is fast and furthermore a near feasible solution is reached early. Here we explore the effects of communication network topology and show that the convergence can degrade with the diameter of the network.

The EMS faces uncertainty in supply due to renewables and in demand. As a result the EDP is solved based on predictions of renewables and demand into the time horizon. As time progresses EMS can correct its predictions and make new predictions for the new horizon based on new information revealed. To this purpose, we consider a receding horizon control which makes up for prediction errors by solving the EDP for the whole horizon, applying the first time step of the scheduled optimal actions and then solving the EDP at the next stage based on updated forecasts. We present a communication protocol that allows for a decentralized implementation of the receding horizon control. The d-EDP coupled with the receding horizon control amounts to a fully decentralized EMS (d-EMS). Finally, we consider scalability and robustness. We show that the d-EMS can incorporate new devices that register and handle device failures on the fly via a simple update of network information during receding horizon control algorithm execution.

Referring now to FIGS. 1A-1C, an exemplary Decentralized Energy Management System (d-EMS) process according to our invention is detailed. First, the system registers with a notification module and initializes time to zero and the optimization horizon. A neighbor list is created. The system also obtains the devices and sets flags.

Next, the process checks if the device fail flag has been set and if so jumps to connector 1 (FIG. 1C) and otherwise performs the d-EDP optimization and local updates are performed (FIG. 1B). Next, the process implements first element of power and storage schedule and increments time and recedes the optimization horizon. The process informs the neighbors of the time and receives time from the neighbors. Next, the process checks if all neighbors in a list has sent time and if so jumps to connector 2 and otherwise checks if the device fail flag has been set. If not, the process continues to receive time from neighbors and otherwise jumps to connector 1.

Continuing from FIG. 1A, FIG. 1B shows in more details the decentralized economic dispatch algorithm. In this process, the iteration counter is cleared and each device sends price to neighbors and also observes prices from all neighbors. Each device then checks if the fail flag has been set and if so, jumps to connector 1 and otherwise updates the variables using price observations. Each device also updates prices and power and storage schedules. Next, it checks if the max counter has been reached and if so the process saves power and storage schedule and continues to the receding horizon control of FIG. 1A. Otherwise the process increments the iteration counter and then checks for device failure. If the device fail flag is set, then the process jumps to connector 1 and otherwise jumps to connector 5.

Figure 1D:
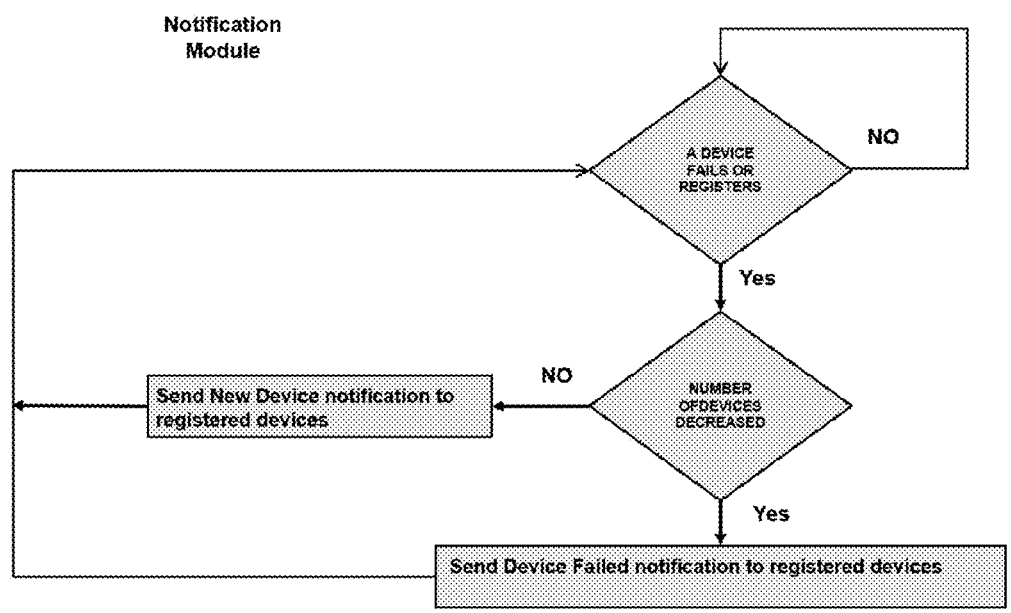

FIG. 1C shows the Online Decentralized Device Reconfiguration. From connector 1, the process updates network information including the number of neighbors, agents and clears the device fail flag and jumps to connector 3. Alternatively, from connector 2, the process checks if the new device flag is set and if so clears the new device flag and jumps to connector 1. Otherwise, before jumping to connector 4, each device reconfigures itself:

Update its forecasts of generation & storage capacity
Receive demand forecasts from Load agent
Initialize primal variables (power and storage schedules and prices)
Set dual variables to zero Turning now to FIG. 1D, the Online Decentralized Device Reconfiguration Notification Module, is disclosed. The process checks if a device fails or registers and if not, loops back to continue checking. Otherwise, if the number of devices have decreased the device failure notification (Device Fail flag=1) is sent to registered devices and otherwise a new device notification (New Device flag=1) is sent to registered devices.

In energy systems, EDP considers cost optimal power dispatch decisions to match the load profile. We use d (h) to denote the predicted demand at time h∈H and the demand profile is defined as d:=[d(1), . . . , d(H)]. We assume that the load profile d is known or d represents the predicted load profile. The energy system is composed of devices N that can generate, store or generate and store power. We use G and S to denote the set of generator and storage units, respectively. The set of all devices in the system is then the union of generator and storage units, N:=G∪S.

A generator unit i∈G has the ability to inject $p_i(h) \geq 0$ amounts of power to the system at time h∈H not to exceed its generation capacity $p_i^{max}(h)$. The generation profile $p_i:=\{p_i(h)\}_{h \in H}$ results in monetary cost of $C_i(p_i)$ for the system where $C_i(p_i)$ is some increasing function that maps load profile to positive reals $R^+$.

A storage unit i∈G can charge/discharge its battery by $s_i(h)$ amounts of power not to exceed its maximum charge/discharge amount $s_i^{max}(h)$. When $s_i(h)>0$, we say that the storage unit charges its battery otherwise we say that it discharges its battery. The battery's state of charge at time h∈H is denoted by $q_i(h) \geq 0$ and is modeled by the following difference equation, $$q_i(h) = q_i(h-1) + \alpha s_i(h) \quad (1)$$

where α is the coefficient converting kW units into Ah (includes time interval). The state of charge cannot exceed $q_i^{max}$ amounts at any point in time due to the specifications of the battery, that is, $0 \leq q_i(h) \leq q_i^{max}$ for any h∈H. The initial state of charge level $q_i(0) \geq 0$ is assumed to be given.

We use $\Omega_{G_i}$ for the set of feasibility constraints of power generation of device i∈N, that is, $p_i \in \Omega_{G_i}$. Similarly, we use $\Omega_{S_i}$ to denote the set of feasibility constraints for the storage profile of i∈N, $s_i:=\{s_i(h)\}_{h \in H} \in \Omega_{S_i}$.

Given the constraints regarding device specifications the EDP chooses generation $p:=\{p_i\}_{i \in N}$ and storage $s:=\{s_i\}_{i \in N}$ profiles that will match supply and demand while minimizing cost, $$\min_{p,s} \sum_{i \in N} C_i(p_i) \quad (2)$$

$$\text{s.t.} \sum_{i \in N} p_i - s_i = d \quad (3)$$

$$p_i \in \Omega_{G_i}, s_i \in \Omega_{S_i} \text{ forall } i \in N \quad (4)$$

The supply demand matching constraint (3) couples the decision variables of the devices. We denote the optimal power and storage profiles to the above equation with p* and s*, respectively. Next, we provide a fully decentralized algorithm based on ADMM that converges to the optimal power generation and storage values.

The ADMM Algorithm is detailed next. For variables $x \in X \subseteq R^l$, $z \in Z \subseteq R^m$, The generic form of the problems that the ADMM algorithm provides decentralized solutions to contain objective functions $f(\cdot):X \to R$ and $h(\cdot):Z \to R$ and linear equality constraints, $$\min_{x \in X, z \in Z} f(x) + h(z) \quad (5)$$

$$\text{s.t. } Ax + Bz = c$$

where $A \in R^{k \times n}$, $B \in R^{k \times m}$ and $c \in R^k$. Note that the objective of the above optimization problem has the form that is separable with respect to its variables while its constraint couples the variables. The ADMM operates on the augmented Lagrangian defined as $$L_\rho(x, z, \lambda) := f(x) + h(z) + \lambda^T(Ax + Bz - c) + \frac{\rho}{2}\|Ax + Bz - c\|^2 \quad (6)$$

where $\lambda \in R^k$ is the price associated with violation of the equality constraint and $\rho > 0$ is a penalty parameter that penalizes infeasibility of (5). The algorithm consists of a coordinate descent in the primal variables in an alternating manner followed by an ascent step in the price variable, $$x_{t+1} := \arg\min_x L_\rho(x, z_t, \lambda_t) \quad (7)$$

$$z_{t+1} := \arg\min_z L_\rho(x_{t+1}, z, \lambda_t) \quad (8)$$

$$\lambda_{t+1} := \lambda_t + \rho(Ax_{t+1} + Bz_{t+1} - c) \quad (9)$$

The minimization of the augmented Lagrangian with respect to x at iteration t+1 requires values of other variables from iteration t, namely, primal variable $z_t$ and price variable $\lambda_t$ in (7). The minimization of the augmented Lagrangian with respect to z at iteration t+1 requires the updated primal variable $x_{t+1}$ and the price variable $\lambda_t$ in (8). The order of primal updates can be interchanged, that is, we can update z first and then x; however, the second variable that is updated still requires the updated value of the first primal variable. The dual ascent step at iteration t+1 in (9) uses the updated primal variables $x_{t+1}$ and $z_{t+1}$ to ascent with step size equal to the penalty parameter ρ.

While the form of the EDP in (2)-(4) belongs to the type of problems that ADMM is designed for, the ADMM algorithm presented above is not a fully decentralized update. It is possible to see this from the discussion above where each primal variable update requires previously updated primal variables. This means that devices need to receive the most recent updates from all of the devices that updated before them in order to update their primal variables. Furthermore the dual ascent step (9) requires a centralized coordinator that has access to network-wide updated primal variables. Hence, we introduce a communication network and present a fully decentralized solution to EDP utilizing the dual consensus ADMM (DC-ADMM).

Consider a connected network with set of nodes corresponding to devices in the grid N and an edge set E where pair of nodes (i,j) belong to E if i can send information to and receive information from j, i↔j, that is, E:={(i,j):i↔j,i∈N, j∈N}. The neighborhood set of i is the set of agents from which agent i can receive information from $N_i$:={(j,i)∈E: j∈N}. We adopt the convention that device i is not the neighbor of itself, that is, i∉$N_i$.

We relax the coupling equality constraint (3) of the EDP problem with the price variables $\lambda$ to obtain the following Lagrangian $$L(\{p_i\}_{i \in N}, \{s_i\}_{i \in N}, \lambda) = \sum_{i \in N} (C_i(p_i) + \lambda^T(p_i - s_i) - \lambda^T d/N). \quad (10)$$

The dual function for the relaxed EDP is obtained by maximizing the negative of the above Lagrangian with respect to the primal variables which we can do separately for each device, $$g(\lambda) := \sum_{i \in N} \max_{\substack{p_i \in \Omega_{G_i} \\ s_i \in \Omega_{S_i}}} -(C_i(p_i) + \lambda^T(p_i - s_i) - \lambda^T d/N). \quad (11)$$

We define the local dual function resulting from maximization of local variables of i as $$g_i(\lambda) := \max_{p_i \in \Omega_{G_i}, s_i \in \Omega_{S_i}} -C_i(p_i) - \lambda^T(p_i - s_i)$$

and rewrite the dual function above as a sum of local dual functions, $$g(\lambda) := \sum_{i \in N} g_i(\lambda) + \lambda^T d/N. \quad (12)$$

The minimization of (12) with respect to $\lambda$ yields the optimal price variables and the optimal primal variables when the original EDP problem in (2) has zero duality gap. However, $\lambda$ is a global variable associated with the equality constraint in (2) and solution to (12) requires information from all devices. In order to solve the dual problem above in a decentralized manner we introduce the local copies of the price variable, that is, i's local copy of $\lambda$ is $\lambda_i$. Then we can equivalently represent the minimization of (12), $\min_\lambda g(\lambda)$ in terms of local copies of the price variable given a connected network, $$\min_{\lambda_1, \ldots, \lambda_N, \{\gamma_{ij}\}} \sum_{i \in N} g_i(\lambda_i) - \lambda_i^T d/N \quad (13)$$

$$\text{s.t.} \quad \lambda_i = \gamma_{ij}, \lambda_j = \gamma_{ij} \text{ forall } j \in N_i, i \in N \quad (14)$$

where $\gamma_{ij}$ are the local auxiliary variables. Note that in a connected network the solution of the above optimization is equivalent to solving $\min_\lambda g(\lambda)$. Further observe that the above optimization is of the form in (5) which implies we can derive an algorithm using the same arguments as in Section 3.1. We first form the augmented Lagrangian for the above problem using the dual variables $u_{ij}$ and $v_{ij}$ the consensus constraints in (14) with the penalty constant $\rho > 0$, $$L_\rho(\lambda_1, \ldots, \lambda_N, \{\gamma_{ij}, u_{ij}, v_{ij}\}) = \sum_{i \in N} g_i(\lambda_i) - \lambda_i^T d/N + \quad (15)$$

$$\sum_{j \in N_i} u_{ij}(\lambda_i - \gamma_{ij}) + v_{ij}(\gamma_{ij} - \lambda_j) + \frac{\rho}{2} \sum_{j \in N_i} \|\lambda_i - \gamma_{ij}\|^2 + \|\lambda_j - \gamma_{ij}\|^2$$

Define the set of price variables of all the agents $\bar{\lambda} := \{\lambda_i\}_{i \in N}$ and the set of all auxiliary variables as $\bar{\gamma} := \{\gamma_{ij}\}_{j \in N_i, i \in N}$. When we apply the ADMM steps in (7)-(9) to the above augmented Lagrangian, we have the following steps at iteration t:

$$\bar{\lambda}_{t+1} = \operatorname{argmin}_{\bar{\lambda}} L_\rho(\bar{\lambda}, \bar{\gamma}_t, \{u_{ijt}, v_{ijt}\}) \quad (16)$$

$$\bar{\gamma}_{t+1} = \operatorname{argmin}_{\bar{\gamma}} L_\rho(\bar{\lambda}_{t+1}, \bar{\gamma}, \{u_{ijt}, v_{ijt}\}) \quad (17)$$

$$u_{ijt+1} = u_{ijt} + \rho(\gamma_{it+1} - \gamma_{ijt+1}) \quad (18)$$

$$v_{ijt+1} = v_{ijt} + \rho(\gamma_{jt+1} - \gamma_{ijt+1}) \quad (19)$$

Starting from the auxiliary variable updates (17) and primal variable updates (16) and using their decomposable structure into $\Sigma_i |N_i|$ and N quadratic sub-problems, respectively, the set of updates above (16)-(19) simplifies and decouples into the following updates $$y_{it+1} = y_{it} + \rho \sum_{j \in N_i} \lambda_{it} - \lambda_{jt} \quad (20)$$

$$\lambda_{it+1} = \quad (21)$$
$$\operatorname{argmin}_{\lambda_i} g_i(\lambda_i) - \lambda_i^T d/N + \sum_{j \in N_i} y_{jt+1}^T \lambda_i + \rho \sum_{j \in N_i} \left\| \lambda_i - \frac{\lambda_{it} + \lambda_{jt}}{2} \right\|^2$$

where we define $y_{it} := \Sigma_{j \in N_i} u_{ijt} + v_{ijt}$ when initial dual variables are all zero $u_{ij0} = 0$ and $v_{ij0} = 0$. The minimization in (21) is actually a min-max optimization problem that implicitly includes the maximization of the primal variables $p_i$ and $s_i$ in the dual function $g_i(\cdot)$. When $C_i(\cdot)$ is convex and strong duality holds for the EDP (2)-(4), they provide the following closed form solution for the min-max problem in (21) using the minimax theorem $$\lambda_{it+1} = \frac{1}{2|N_i|} \left( \sum_{j \in N_i} (\lambda_{it} + \lambda_{jt}) + \frac{1}{\rho}\left(p_{it+1} - s_{it+1} - \frac{1}{N}d\right) - \frac{1}{\rho} y_{it+1} \right), \quad (22)$$

$$(p_{it+1}, s_{it+1}) = \operatorname{argmin}_{p_i \in \Omega_{G_i}, s_i \in \Omega_{S_i}} C_i(p_i) + \quad (23)$$

$$\frac{\rho}{4|N_i|} \left| \frac{1}{\rho}\left(p_i - s_i - \frac{1}{N}d\right) - \frac{1}{\rho} y_{it+1} + \sum_{j \in N_i} (\lambda_{it} + \lambda_{jt}) \right|_2^2.$$

Observe that the price variable update in (22) requires the updated primal variables of time t+1 from (23). Hence device i first updates the primal variables and then the price variable. The updates for device i are summarized in Algorithm 1.

---
Algorithm 1 d-EDP updates at device i
---

Require: Initialize primal variables $p_{i0}$, $s_{i0}$, $\lambda_{i0}$ and
    dual variables $y_{i0} = 0$. Set t = 0.
Require: Determine stopping condition, e.g., maximum
    number of steps $T \in \mathbb{N} |^+$.
    while Stopping Condition Not Reached do
        [1] Transmit $\lambda_{it}$ and receive $\lambda_{jt}$ from $j \in \mathcal{N}_i$.
        [2] Compute $y_{it+1}$ using ([20]).
        [3] Update primal variables $p_{it+1}$, $s_{it+1}$ using ([23]).
        [4] Compute prices $\lambda_{it+1}$ using ([22]).
        [5] Set t= t+1.
    end while

---

Algorithm 1 solves the dual EDP in a fully decentralized manner. The initialization consists of setting dual variables $y_{i0}$ to zero. Other variables $p_{i0}$, $s_{i0}$, $\lambda_{i0}$ can be arbitrarily set. The algorithm at time t starts by sending local price variables $\lambda_{it}$ and observing neighbors' local price variables $\lambda_{N_i t} := \{\lambda_{jt}: j \in N_i\}$. The algorithm is synchronous in that device i requires prices of all of its neighbors from iteration t. Then in step 2 device i averages the neighbors' price variables to update its dual variable (20). Along with observed price variables $\lambda_{N_i t}$, the dual variables $y_{it+1}$ are used to update the primal power and storage variables following (23) in step 3. Finally in step 4 device i updates its local price variable $k_{it+1}$ using all of the observed and updated variables according to (22). The algorithm continues by moving the iteration step forward.

The derivation above is worth retracing. The primal EDP problem in (2)-(4) contains a power balance constraint that couples the variables of all the devices. Therefore, we consider a decentralized solution operating on the relaxation of the power balancing constraint. The relaxed problem in (??), i.e., the dual EDP entails a global price variable $\lambda$ that is associated with the price of power imbalance. We then write an equivalent representation of the dual EDP as a dual consensus EDP in (13)-(14) where each device carries their local copy of the price. Applying the ADMM algorithm to the dual consensus EDP yields a fully decentralized solution.

The iterations of Algorithm 1 asymptotically converges to optimal variables when the problem is convex, the network (N,E) is connected and strong duality holds. We assume that the cost $C_i(p_i)$ is convex in $p_i \in \Omega_{G_i}$ and the network is connected for the centralized EDP in (2)-(4). A sufficient condition for strong duality is Slater's condition which requires that there exists a strictly feasible point. For a set of linear equality and inequality, this condition relaxes to the existence of a feasible point. For the EDP problem in (2)-(4) the constraints are all affine. Furthermore, we assume that the energy system is connected to the grid which can satisfy demand at all times. This assumption makes sure that there exists a feasible point $\{p_i, s_i\}_{i \in N}$ that satisfies power balance constraint (3) and other device specific constraints (4). Consequently, the assumptions of Theorem 2 in [13] are all met and the iterations of Algorithm 1 converge to the optimal, that is, $p_{it} \rightarrow p^*_i$, $s_{it} \rightarrow s^*_i$. The d-EDP is such that the solution yields optimal local prices along with the optimal power and storage profiles, that is, $\lambda_{it} \rightarrow \lambda^*$. The local optimal prices can then be used to design smart pricing policies such as real time pricing for demand response management.

Given a time horizon H a centralized receding horizon control for EDP solves the optimization in (2) for the whole horizon to obtain power and storage profiles but only uses the first element of the optimal profile for step h=0. Before h=1, the EDP is solved for hours h=1 to H+1 and the scheduled element for h=1 is applied and the horizon is propagated by one again. In order to implement the decentralized receding horizon control, we use the d-EDP algorithm for each hour and furthermore we require a communication protocol that synchronizes devices for starting the updates for the next time step. Note that the updates in d-EDP require only local forecasts and device specifications. Hence each device can update its forecasts locally. We assume the demand profile is forecasted by a load device and is communicated to all the devices.

The proposed communication protocol for device i is detailed in Algorithm 2. Each device starts the algorithm by updating its local forecasts for the operating horizon. Then each device sends a request to start planning for the horizon in step 2 and waits to receive requests from all their neighbors in step 3. When all neighboring devices send their requests, device i starts the d-EDP Algorithm 1 in step 4. Once Algorithm 1 is complete, device I applies the first element of the scheduled power and storage profile in step 5. When the power is dispatched, the device propagates its time in step 6 and goes back to step 1 to start planning for the the current time horizon.

---
Algorithm 2 Decentralized receding horizon at device i
---

Require: Initialize time h = 0.
Require: Initial demand forecast profile d and local
    forecasts if applicable.
    loop
        [1] Update local forecasts for h to H + h.
        [2] Request neighbors to start planning.
        [3] Wait until all neighbors also send their requests.
        [4] Do d-EDP (Algorithm [1]).
        [5] Apply the first element of $p_{iT}^*(h)$ and $s_{iT}^*(h)$.
        [6] Advance time h = h + 1.
    end loop

---

Changes to the network can occur when a device leaves or a new device joins. When a device is removed all the devices interrupt their operations and update their network information, that is, their neighborhood list $N_i$ and the total number of devices N. Then they restart Algorithm 2 from step 1. When a device is added, devices update their network information at the beginning of the next time step, that is, after advancing time in step 6. This means that the new device is admitted to the system in the next time step. The new device updates its network information upon connection to the network and starts from step 1 and waits at step 3 for his neighbors to send requests. For a centralized solution to the EDP a device removal or addition implies reconfiguring the optimization problem by removing or adding new variables, constraints and cost functions. Reformulating the optimization problem can be cumbersome when the network is changing frequently. The steps of the decentralized receding horizon method described in Algorithm 2 require that the devices only need their neighbor list and the total number of devices in the system.

In one embodiment, a Decentralized Management Platform includes a multi-agent framework and a decentralized control method to manage the large-scale community-level energy systems. The Multi-agent framework for energy systems includes a procedural architecture to add devices as agents into the energy system framework and submit the services they provide for or request from other agents. This framework is dynamic in which agents can join or leave the energy system at any time without interrupting the rest of the system. Supplier agent includes devices which can provide power to supply the load submit their service as a supplier and play as an active agent in the multi-agent framework. The example of these agents can be grid, diesel, PV, battery, etc. It should be noted that battery can be both supplier agent and demand agent. Demand agents includes loads in the network will submit their service as demand in multi-agent framework and inform supplier agents about their requested load value.

The system provides a reliable and scalable decentralized platform that efficiently manages the operation of a large-scale energy system based on requested load, available renewable generation, time-of-use grid electricity rate, battery condition, diesel generator loading-based cost, etc. In this dynamic platform, any device can join or leave the energy system at any time without interrupting the rest of the system.

Figure 2:
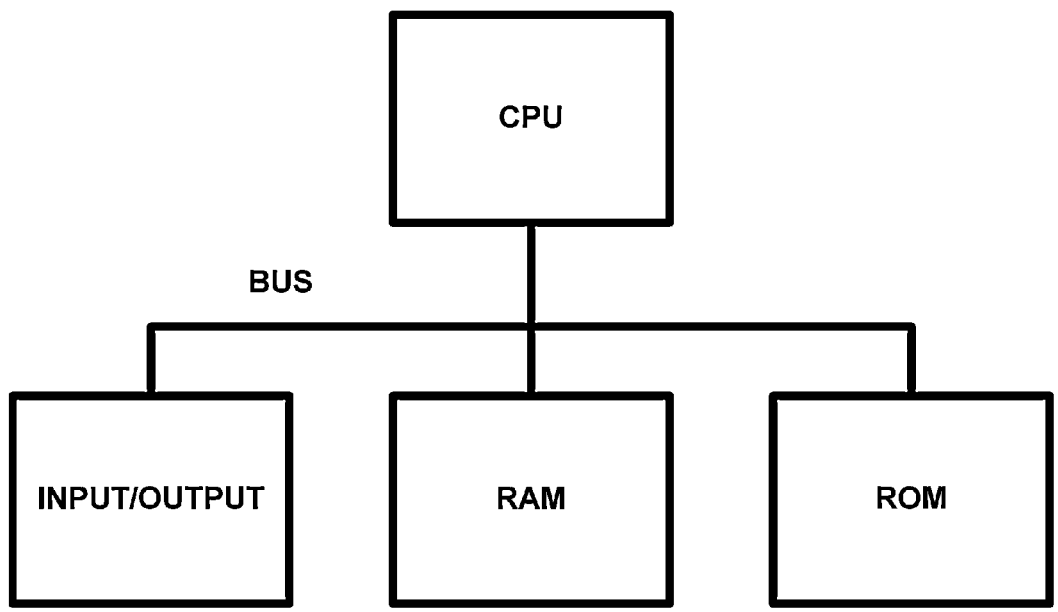
FIG. 2 shows an exemplary system running the process of FIGS. 1A-1C.

The system may be implemented in hardware, firmware or software, or a combination of the three. FIG. 2 shows an exemplary computer to execute object detection. In the decentralized approach of the present system, each device will have its own programmable computer (processor, embedded system) that communicates with other devices' computers (processors, embedded systems), and they collectively solve the energy management problem.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for power management, comprising:
   applying a decentralized control to manage a large-scale community-level energy system;
   obtaining a global optimal solution satisfying constraints between agents representing the energy system's devices as a state-based potential game with a multi-agent framework;
   independently optimizing each agent's output power while considering operational constraints and assuring a pure Nash equilibrium (NE), wherein a state space helps coordinating the agents' behavior in energy system to deal with system-wide constraints including supply demand balance, battery charging power constraint and satisfy system-wide and device-level (local) operational constraints; and
   controlling distributed generations (DGs) and storage devices using the agent's output.

2. The method of claim 1, comprising adding devices as agents into an energy system framework and submitting the agent's services or request from other agents, wherein agents dynamically join or leave the energy system at any time without interrupting the rest of the energy system.

3. The method of claim 1, comprising handling supplier agents or devices to provide power to supply a load and submit their service as a supplier.

4. The method of claim 3, comprising playing as an active agent in the multi-agent framework, wherein the agents include grid, diesel, PV, or battery.

5. The method of claim 1, comprising handling a demand agent, wherein each load in a network submit its service as demand in the multi-agent framework and inform supplier agents about its requested load value.

6. The method of claim 1, comprising applying a distributed dispatching strategy for energy sources and loads to minimize a total marginal cost of operation for the energy system and satisfy device-level and system-wide level operational constraints.

7. The method of claim 6, wherein the dispatching strategy comprises applying a game theory, a state-based potential game, a learning algorithm, a gradient play or a Newton method.

8. The method of claim 1, comprising determining a total cost of operation for the energy system (system-wide cost model) as a summation of the devices' operational cost (local cost models).

9. The method of claim 1, wherein system-wide operational constraints are satisfied through passing message packages and negotiations between the agents and agent local constraints are handled locally by a related agent.

10. The method of claim 1, wherein the agents use one or more learning algorithms at each iteration of the game.

11. A method for power management, comprising:
    applying a decentralized management platform based on multiagent framework and state-based potential game;
    analytically obtaining a global optimal solution satisfying constraints between agents (energy system's devices);
    applying the power management as a game where each agent is able to independently optimize its output power while considering its operational constraints;
    assuring a Nash equilibrium (NE) exists.

12. The method of claim 11, comprising using a state-based potential game where a state space added to the game helps with coordinating the agents' behavior in energy system to deal with system-wide constraints including supply demand balance, battery charging power constraint, wherein the NE of the game is efficient with respect to system total cost of operation and satisfies system-wide and device-level (local) operational constraints.

\* \* \* \* \*